(12) United States Patent
Glew (10) Patent No.: US 7,996,656 B2
(45) Date of Patent: Aug. 9, 2011

(54) ATTACHING AND VIRTUALIZING RECONFIGURABLE LOGIC UNITS TO A PROCESSOR

(75) Inventor: Andrew F. Glew, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 722 days.

(21) Appl. No.: 11/903,914

(22) Filed: Sep. 25, 2007

(65) Prior Publication Data

US 2009/0083518 A1    Mar. 26, 2009

(51) Int. Cl.
*G06F 9/30* (2006.01)
(52) U.S. Cl. ...................................... 712/220
(58) Field of Classification Search .................. 712/15, 712/220
See application file for complete search history.

(56) References Cited

U.S. PATENT DOCUMENTS

| | | | |
|---|---|---|---|
| 5,333,283 A * | 7/1994 | Emma et al. | 712/236 |
| 5,426,378 A * | 6/1995 | Ong | 326/39 |
| 5,748,979 A * | 5/1998 | Trimberger | 712/37 |
| 6,052,773 A * | 4/2000 | DeHon et al. | 712/43 |
| 6,077,315 A * | 6/2000 | Greenbaum et al. | 717/157 |
| 6,167,358 A * | 12/2000 | Othmer et al. | 702/188 |
| 6,434,689 B2 * | 8/2002 | Fleck et al. | 712/34 |
| 6,725,356 B2 | 4/2004 | Hansen et al. | 712/210 |
| 6,934,937 B1 * | 8/2005 | Johnson et al. | 717/129 |
| 7,100,060 B2 * | 8/2006 | Cai et al. | 713/320 |
| 7,200,735 B2 * | 4/2007 | Wang et al. | 712/33 |
| 2003/0097546 A1 * | 5/2003 | Taylor | 712/226 |

OTHER PUBLICATIONS

Jacob et al., "Memory Interfacing and Instruction Specification for Reconfigurable Processors", 1999, pp. 145-154.*
DeHon, "DPGA-Coupled Microprocessors: Commodity ICs for the Early 21st Century", 1994, 9 pages.*
Toshiaki Miyazaki, "Reconfigurable Systems: A Survey," Jan. 1998, pp. 447-452.
Tensilica, "xtensa 7, Product Brief," 2006, pp. 1-6.
Xilinx®, "virtex-II Pro and Virtex-II Pro X Platform FPGAs: Complete Data Sheet," Mar. 5, 2007, pp. 1-9.

* cited by examiner

*Primary Examiner* — David J Huisman
(74) *Attorney, Agent, or Firm* — Trop, Pruner & Hu, P.C.

(57) ABSTRACT

In one embodiment, the present invention includes a pipeline to execute instructions out-of-order, where the pipeline has front-end stages, execution units, and back-end stages, and the execution units are coupled between dispatch ports of the front-end stages and writeback ports of the back-end stages. Further, a reconfigurable logic is coupled between one of the dispatch ports and one of the writeback ports to perform specialized operations or handle instructions that are not part of an instruction set architecture (ISA) used by the pipeline. Other embodiments are described and claimed.

4 Claims, 5 Drawing Sheets

ATTACHING AND VIRTUALIZING RECONFIGURABLE LOGIC UNITS TO A PROCESSOR

BACKGROUND

Reconfigurable logic (RL) available using programmable logic arrays (PLAs) are promoted as providing power savings, performance improvements and smaller chips, by crafting custom logic to solve particular problems that stretch the capabilities of microprocessors, by customizing data path widths to a specified amount and allowing the same circuitry to be reconfigured for different protocols if only one is in use at a time. However, there are various obstacles to its use in modern microprocessors. Currently, such reconfigurable logic is only used in an embedded system and cannot be used by multiple users without cooperation. Generally, the full power of RL is only used by in-order processors or when the RL is configured as an independent coprocessor.

DETAILED DESCRIPTION

In various embodiments, a reconfigurable logic unit (RL) may be attached to an out-of-order (OOO) processor to enable use of the RL by the out-of-order processor, enabling the benefits of reconfigurable logic in a modern processor pipeline. As will be described further below, the RL may be attached in various locations of such a processor. Furthermore, the RL services may be requested in various manners including, for example, synchronously by an instruction that conceptually blocks the general purpose processor until the RL operation is completed, by an operation that "forks" one or more threads of execution using the RL, or via a device driver that initiates asynchronous processes using the RL. As used herein, an RL is a unit in which a function to be performed can itself be changed. The configuration of the RL, i.e., the functions performed by the logic (e.g., lookup table (LUT)-implemented logic functions), and which RL elements are connected to each other, may itself be part of the RL state. The RL then may itself be configured as a coprocessor with specialized state such as registers. Thus an RL includes a plurality of logic blocks and interconnection blocks that may be coupled together by an interconnection network, rather than any type of bus. In this way, dynamic reprogramming of the logic blocks may be realized, oftentimes with fine granularity. Such reconfiguration may be performed by software, as desired for a given task of a running process or upon a context switch from a first software process to a second software process.

Using one or more such RL units within a processor, particular operations may be performed. Specifically, in many implementations these operations may correspond to specialized functions, bit permutations, or other operations to be performed on small amounts of bits. In this way, such operations can be efficiently performed without consuming the relatively larger area of a processor pipeline, in which operations are often relegated to fixed instruction and data widths of 16, 32 or 64 bits.

While the scope of the present invention is not limited in this regard, some examples of operations to be performed on such an RL unit may be as follows: cryptography, audio and/or visual recognition, or other operations. Specifically, for such operations various bit permutation operations such as bit munging may be performed to permute or rearrange bits in a particular specific manner. Other implementations may be for field extraction and video processing such as taking relatively small numbers of bits in multiple video fields, e.g., so-called Y, U and V fields and converting them into 16 bits of each of Y, U and V fields and so forth. Similarly, to effect such operations matrix operations, which may be on bit widths of a relatively small width, e.g., 4×4 bit widths, can be performed. Still further, specialized floating point representations such as in accordance with a given Institute of Electrical and Electronics Engineers (IEEE) Standard 32 or 64 bit numbers such as a floating point (FP) representation having 16 bits with a 4 bit exponent can be performed. For example, specialized fixed point processing can be performed such as a 2.6 by a 3.5 operation which generates a 5.11 fixed point number, which then must be shifted and extracted and rounded to a 2.6 representation. Of course, other idiosyncratic bit widths may also be manipulated in reconfigurable logic. Still further, embodiments may use RL implementations for custom interconnects, sorting networks such as a bubble network or so forth.

Still further, other implementations may be used to handle instructions to perform particular operations, where such instructions have not been implemented into a given instruction set architecture (ISA) of the processor with which the RL is associated. For example, certain processors may lack an instruction for a bit matrix multiply, which may be used for various cryptographic and/or recognition operations. Similarly, a Galois field multiply operations, which may be used for error correction coding (ECC) and cryptography may also be realized using RL. Other operations such as compression operations such as compressed bits under a mask, can also be implemented.

Still further, embodiments may implement monitoring of usage of on-board RL units for such specialized operations, e.g., by way of counters, performance monitors and so forth. As different end users of processors including such RL units implement code to incorporate these specialized features, counts may be updated and intermittently provided to a manufacturer of the processors. In this way, accurate feedback regarding desirability of different operations based on their usage in user applications can be determined. In this way, it may later be determined by the manufacturer that one or more of such instructions unavailable in a given ISA are in sufficiently wide usage that the expense, area and power consumption needed for incorporation into the general-purposes processor is appropriate. In this way, feedback from users of a processor can drive design of features for future generation general-purpose processors. To this end, software such as microcode may be included within the processor to enable the counting, performance monitoring, and feedback transmission to the manufacturer.

Figure 1A:
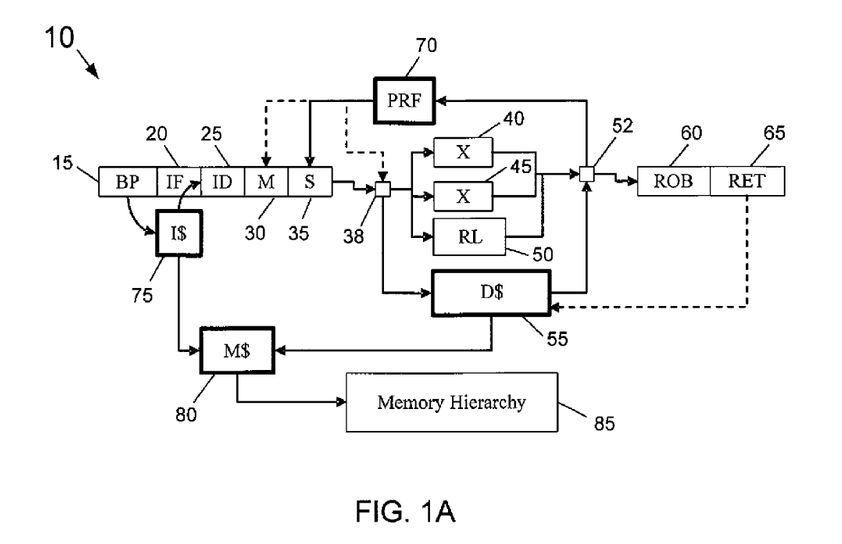
FIG. 1A is a block diagram of a processor in accordance with an embodiment of the present invention.

Referring now to FIG. 1A, shown is a block diagram of a processor in accordance with an embodiment of the present invention. As shown in FIG. 1A, processor 10 may be an out-of-order processor that includes at least one RL. Specifically, as shown in FIG. 1A, processor 10 may be a multi-stage processor including so-called front-end and back-end pipeline stages. In the embodiment shown in FIG. 1A, processor 10 may include a branch prediction unit 15 coupled to an instruction fetch unit 20 which is turn is coupled to an instruction decode unit 25. Note that branch prediction unit 15 and instruction decode unit 25 may be coupled to an instruction cache 75.

As further shown in FIG. 1A, instruction decode stage 25 is coupled to a mapping stage 30, which may perform reordering of instructions. In turn, mapping stage 30 is coupled to a scheduler 35, which schedules operations to be performed in a given execution unit. In the embodiment shown in FIG. 1A, such execution units include first and second execution units 40 and 45, which may be an integer arithmetic logic unit (ALU) and a floating point ALU (FPALU), although the scope of the present invention is not limited in this regard. Still further, an RL 50 may also be coupled to receive operations from scheduler 35. Also present is a data cache 55. All of these components, namely execution units 40 and 45, RL 50, and cache 55 are coupled between scheduler dispatch ports 38 and write-back ports 52. These ports may also be coupled, as shown in FIG. 1A to a physical register file (PRF) 70 to both receive data therefrom and provide results thereto. FIG. 1A further shows back-end portions of processor 10, including a reorder buffer (ROB) 60 in turn coupled to a retirement unit 65, which itself may be coupled to cache 55.

Note that processor 10 further includes portions of a memory hierarchy. Specifically, instruction cache 75 and data cache 55 may be coupled to a shared cache 80, which in one embodiment may be a shared instruction and data cache, e.g., of a level 2 (L2) cache, which in turn may be coupled to other memory levels 85 such as additional caches, external memory and so forth. While shown with this particular implementation in the embodiment of FIG. 1A, the scope of the present invention is not limited in this regard.

If the RL function has approximately the same latency as one of the fixed latency execution units, such as an integer ALU (typically 1 cycle) or a floating point add or multiply (typically 4 or more cycles), it can be handled similarly in the pipeline. The RL may be given its own superscalar pipeline with its own scheduler dispatch and writeback ports, or it may share a dispatch and/or writeback ports with some preexisting functional unit, and therefore not increase the superscalarness.

Figure 2A:
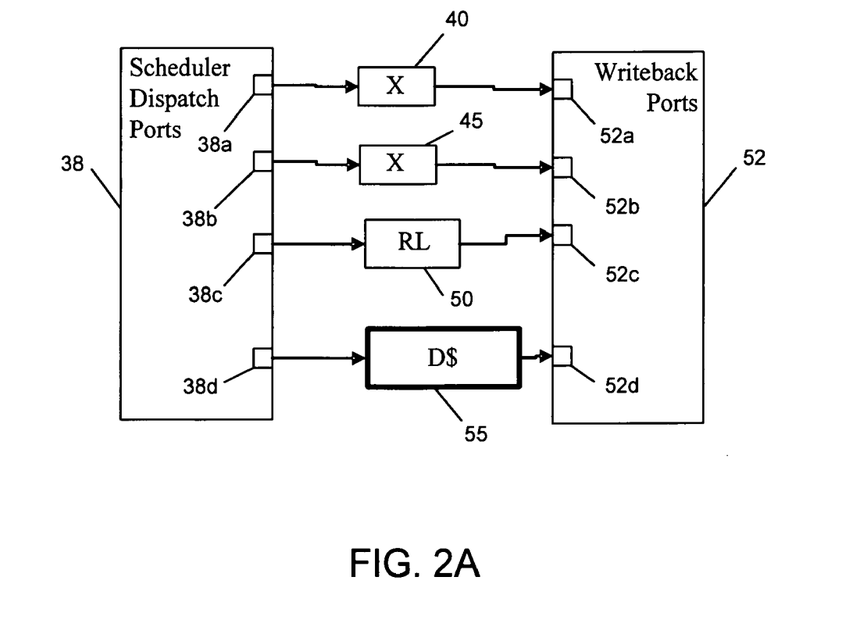
FIGS. 2A-2D are block diagrams showing coupling of a reconfigurable logic unit in accordance with various embodiments of the present invention.
Figure 2B:
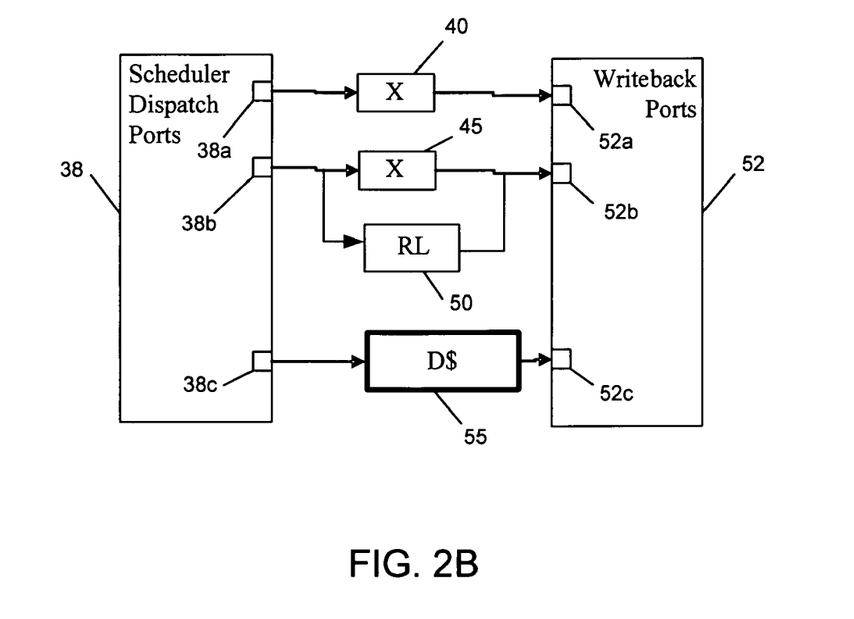

As shown in FIG. 2A, in one embodiment superscalarness may be increased for the RL unit by providing separate ports 38A-38D and 52A-52D in dispatch ports 38 and writeback ports 52, respectively for RL unit 50. In the embodiment shown in FIG. 2B, the RL unit may share ports with a given functional unit, without increasing superscalarness. Specifically, as shown in FIG. 2B, RL unit 50 may share a dispatch port 38B and a writeback port 52B with execution unit 45.

Single cycle latencies comparable to integer ALU latencies may be limiting for reconfigurable logic. They are suited for small functions that are otherwise inconvenient to implement using separate instructions, such as format conversions for densely packed bit formats, e.g., expanding a 4:2:2 $Y_0 \, U_0 \, Y_1 \, V_1 \, Y_2 \, U_2 \, Y_3 \, V_3$ video stream into the following 4 pixels $[Y_0 \, U_0 \, V_1] \, [Y_1 \, U_0 \, V_1] \, [Y_2 \, U_2 \, V_3] \, [Y_3 \, U_2 \, V_3]$—where each component is 4 bits wide, this easily fits within a 64 bit wide datapath. Performing such a conversion requires more than a dozen scalar instructions, and even with powerful single instruction multiple data (SIMD) shuffle and permutation instructions have considerable overhead, yet are straightforward to implement in RL. Multicycle latencies comparable to the 4 or more cycles of floating point operations allow more powerful operations to be implemented in RL. Treating RL like floating point multiply-accumulate $D \leftarrow A*B+C$ is well suited, since it has 3 inputs. Powerful RL operations often require many input bits. SIMD operations, e.g., inputs 4*32=128 bits wide, are similarly advantageous; SIMD floating point multiply-accumulate (FMAC) better yet, with 3*128=384 bits of input.

Figure 2C:
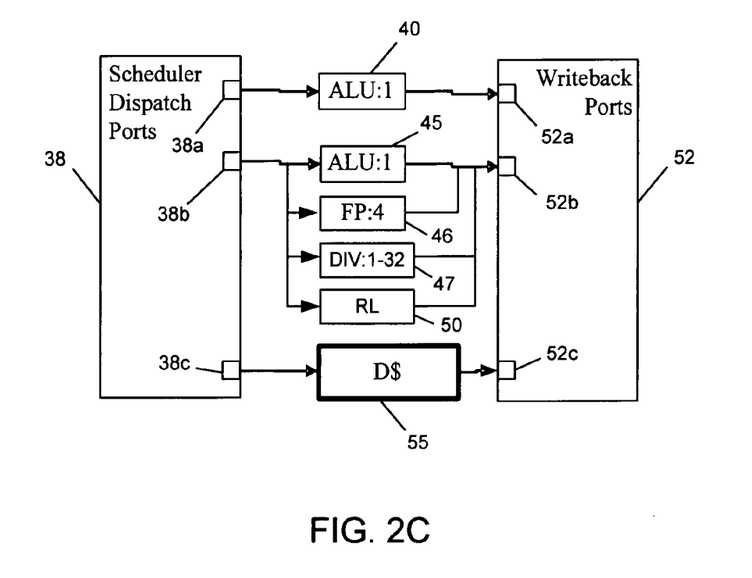

Generalizing, out-of-order processors cannot rely on implicit inputs via code ordering. Out-of-order processors often have limited inputs to each operation, (2 or 3). Implementing specialized functions such as RL on an out-of-order processor may have as many input bits as possible, since implicit inputs are harder to obtain via ordering. In addition to the number of input bits, timing, the latencies of the operation may be of concern One place to attach specialized hardware such as RL to the pipeline of an out-of-order processor, where the function has a long or variable latency, is at approximately the same place as the divide hardware (integer or FP). Division is often implemented by a special hardware block implementing an iterative algorithm that may exhibit variable latency. Such a configuration would not only allow long RL latencies, but might also allow complicated variable latency functions to be implemented using RL. Placing the RL near or around the divider and multiplier (if the FP divider uses a multiplicative algorithm) has other advantages, since it may allow the RL to control the large multiplier array and/or perform operations using the multiplier. Thus in the embodiment shown in FIG. 2C, RL unit 50 may be coupled between dispatch port 38B and writeback port 52B in parallel with execution unit 45, floating point unit 46 and divider unit 47.

Figure 2D:
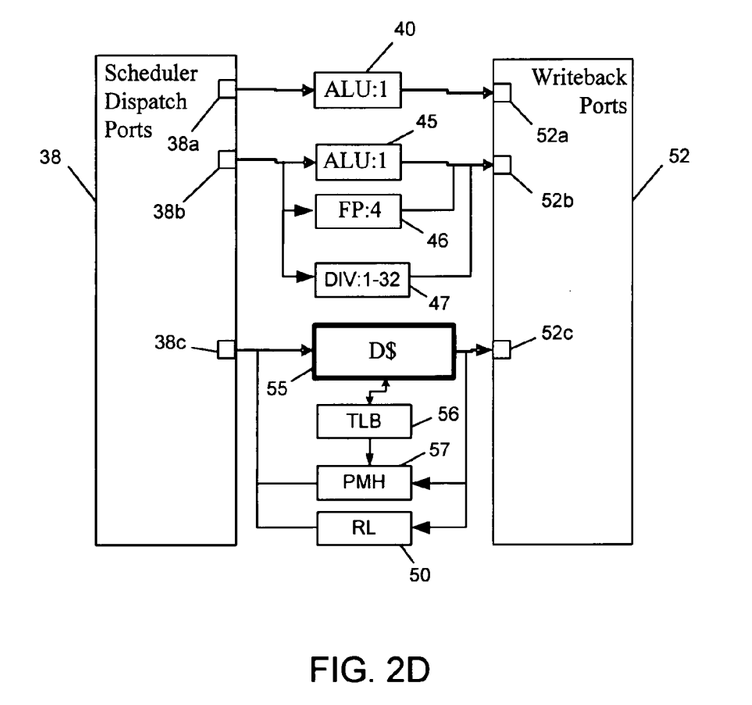

Another place to attach RL logic to the execution pipeline is to treat it like the data cache, D$. The data cache already handles variable latencies caused by cache misses, translation lookaside buffer (TLB) misses, misaligned split memory accesses, and so forth, and must arbitrate between operations hitting the data cache and data returning from cache misses. However, the data cache hit path is one of the most critical in the processor. It is likely to be too "tight" to allow the overhead, in time and space, of attaching RL. Another place, near the data cache but in a location probably less critical for timing, is the page miss handler (PMH)—the page table walker, or TLB miss handling state machine. This is particularly well suited as a place to situate special hardware such as an RL functional unit, since it is less critical for timing, but already has access to key datapaths such as writeback. In some embodiments, the PMH operates by inserting special load micro operations (uops) to walk the page tables, e.g., directly to the first level data cache. In other processors, the PMH inserts uops to the L2 cache, not the L1, to reduce impact on the critical first level cache access. The ability for special function units such as RL to insert operations to access memory via the data caches, and also to access virtual memory hardware such as the TLB, has particular advantages for virtualization. In addition to virtualization, the ability to insert memory access uops enables the special function unit such as RL to acquire more inputs (and to produce more outputs), enabling complex operations that are more likely to show the benefits of special hardware such as RL. As shown in FIG. 2D, RL unit 50 may be coupled between dispatch port 38C and writeback port 52C in parallel with data cache 55, TLB 56 and PMH 57.

Typical modern processors are speculative: instructions may be executed, which should later be cancelled as a result of branch mispredictions or other events. The pipeline attachments described above may be suitable for "pure" functions: special hardware such as RL which, apart from the RL configuration information, is stateless. Such an RL operator would take its inputs and produce its outputs, without modifying state that affects subsequent operations.

As explained above, in an out-of-order processor software cannot rely on instructions to execute in the order in which they are fetched by the instruction sequencer. One way to overcome this is to enforce serialization, e.g., by adding artificial dataflow dependencies, as shown in the example code below:

```
RL configurations 0, 1, 2, 3 loaded
RLdepRegRL_operation_reset
RLdepReg ← RL_load(EAX,RLdepReg)      // loaded into RL register #1
RLdepReg ← RL_load(EBX,RLdepReg)      // loaded into RL register #2
RLdepReg ← RL_load(ECX,RLdepReg)      // loaded into RL register #3
RLdepReg ← RL_load(EDX,RLdepReg)      // loaded into RL register #4
RLdepReg ← RL_operate2(RLdepReg)      // RL2(EAX,EBX,ECX,EDX)
RLdepReg ← RL_load(MMX0,RLdepReg)     // loaded into RL register #1
RLdepReg ← RL_load(MMX1,RLdepReg)     // loaded into RL register #2
RLdepReg ← RL_load(MMX2,RLdepReg)     // loaded into RL register #3
RLdepReg ← RL_load(MMX3,RLdepReg)     // loaded into RL register #4
RLdepReg ← RL_operate2(RLdepReg)      // RL2(MMX0,MMX1,MMX2,MMX3)
```

The simple example above uses a single register, RLdepReg, to force all of the RL related uops to execute in sequence. A register, or at least a renaming resource, is dedicated to this purpose; if it can be overwritten by user code the serialization would be broken. If some reordering is acceptable, e.g., loading registers for different configurations not overlapping, different dataflow can be created using more registers.

Such artificial dataflow dependencies can also be used to ensure that a configuration is completely loaded before RL operations are begun. In other implementations, using memory-like RL uops to manage ordering may be realized. In this example, the "RL_load" operations have side effects: they modify "registers" in the RL block. Unless the RL block is intimately aware of how the processor handles misspeculations such as branch mispredictions and their recovery, such side effects cannot be allowed to be performed until retirement.

In yet other embodiments, placing RL or other special hardware in the pipeline of a speculative processor, in such a way that multi-part operations such as those expressed above can be implemented, but the RL state can be recovered on a branch prediction. Standard OOO techniques can be used: checkpointing all of the state, and then recording changes more recent than a checkpoint, so that they can be reapplied to a misspeculation point; or, reversible anti-operations. With arbitrary RL it may be hard to do this in general; but for the special case of loading operand values, it is easy to implement.

In one particular embodiment, "RL_load" ops may be handled like memory stores. This doesn't mean that they would be memory mapped, but rather that they would use the same mechanisms, the store buffer, and so forth, as memory stores. Memory stores are performed in order, at or after retirement. Ordering of stores with subsequent loads can be maintained by creating uops which behave like uncached, at-retirement, loads (compared to stores which are performed after retirement). Store-like uops can be fully pipelined; however, at-retirement loads cannot be. Such store-like and load-like RL uops may have artificial "addresses" applied to them, so that existing store-buffer conflict detection mechanisms can be used to enforce ordering, as shown in the example code below:

```
RL configurations 0, 1, 2, 3 loaded
// in the below "a" is an address
store-like RL_load(a,EAX)    // loaded into RL register #1
store-like RL_load(a,EBX)    // loaded into RL register #2
store-like RL_load(a,ECX)    // loaded into RL register #3
store-like RL_load(a,EDX)    // loaded into RL register #4
```

-continued

```
dest ← load-like RL_operate2(a)     // RL2(EAX,EBX,ECX,EDX)
Dest2 ← load-like RL_operate2(a)
store-like RL_load(a,MMX0)// loaded into RL register #1
store-like RL_load(a,MMX1)// loaded into RL register #2
store-like RL_load(a,MMX2)// loaded into RL register #3
store-like RL_load(a,MMX3)// loaded into RL register #4
dest ← load-like RL_operate2(a)
// RL2(MMX0,MMX1,MMX2,MMX3)
```

Using artificial address dependencies enforces ordering between the store-like uops that set up a configuration, or load extra operand inputs, and subsequent load-like uops that depend on the store-like uops. However, in an out-of-order processor normal cacheable loads can be performed out-of-order. This would disallow RL operations that produce both an output and a side effect that affects subsequent operations. Treating such side-effects as at retirement loads would be correct, but impede performance. Instead, by writing the result to an artificial dependency register and then moving it, a true dependency may be performed. In other embodiments, if it can be guaranteed that no misspeculations will be reported in the middle of the RL_load sequences, the register dataflow can be used, although interrupts would be blocked and page faults averted.

In yet other embodiments, special hardware such as RL logic may be attached anywhere in the cache hierarchy or memory subsystem. Attaching the RL like a non-memory function unit may allow more RL function units to be implemented. It works for pure functions, but not for functions with extended inputs. It requires, however, that the RL configuration load be serialized, or otherwise forced to be at or after retirement. Memory-like RL uops have a natural synchronization and serialization mechanism. There may be fewer ports. But it provides freedom as to where in the memory system the RL is attached.

Figure 1B:
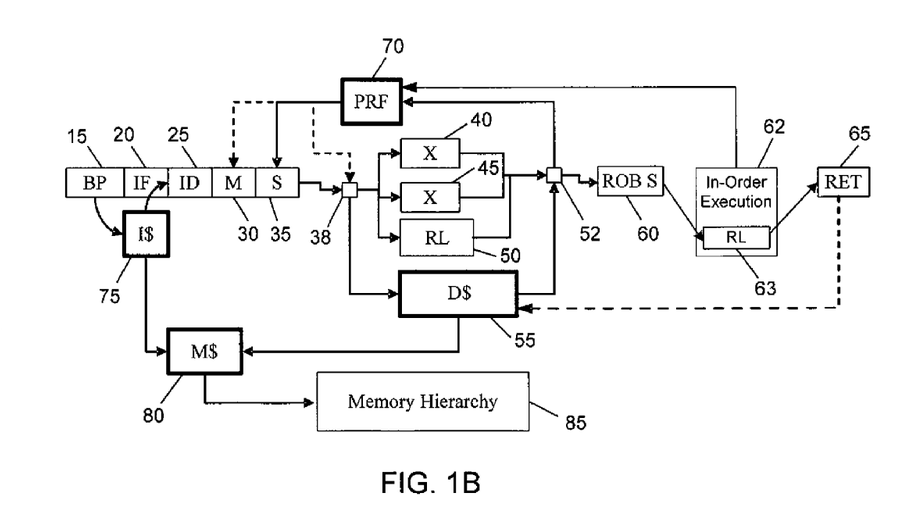
FIG. 1B is a block diagram of a processor in accordance with another embodiment of the present invention.

The above embodiments relate to attaching the special hardware function block such as RL in an out-of-order section of the processor pipeline. Although out-of-order execution has many advantages, in-order execution can be significantly more efficient for some operations—particular operations that produce a lot of state, which would be too expensive to manage by dataflow. FIG. 1B shows a microarchitecture that combines out-of-order and in-order pipelines. In addition to the conventional out-of-order execution subsystem, with renamer/mapper, scheduler, execution units, ROB, and PRF, there is an in-order execution section 62 including a RL unit 63 after reordering in ROB 60, before retirement stage 65. Various operations, such as integer ALU or D$ access, could be performed in the in-order section. Techniques such as pipelining that support fast in-order processors can be used here. In some embodiments, highly stateful function units, such as encryption or compression, or operations that use large amounts of dataflow, such as vectors and matrices, can be implemented in special hardware, such as reconfigurable logic, placed in the in-order section.

Note that register values flow between the out-of-order and in-order sections. While not shown in FIG. 1B, in-order execution units may be connected to memory, which may be desirable for memory intensive operations, but is not required. In the embodiment of FIG. 1B, RL unit 50 may be best suited for pure functions, although the techniques of the previous section can be applied. RL unit 63 is best suited for highly stateful operations. In general, the earlier position in the pipeline of RL unit 63 may reduce the branch misprediction penalty, if the specialized hardware such as RL is used in branch computations.

An RL unit may be used for flow control. That is, one area where dedicated hardware such as RL is faster than a software implementation using general purpose instructions is in selecting complex, multiway, alternatives using a large number of irregular inputs. A typical multi-way branch can be implemented using lookup tables. But, N bits of input naturally require a lookup table of size $2^N$. Sparse branch conditions may require far fewer terms in an RL solution such as a programmable logic array (PLA), e.g., mainly triangular patterns such as the following may only require linear terms; but the irregularities may prevent a simple code sequence from calculating the output. PLAs are essentially a simplified, compressed, lookup table for such functions.

| | |
|---|---|
| 0000_0000_0000_0000 | 0 |
| 1100_0000_0000_0000 | 1 |
| 1010_0000_0000_0000 | 2 |
| 0000_1xxx_xxxx_xxxx1→ | 3 |
| 0000_0100_0000_0000 → | 4 |

In the microarchitectures described above the RL blocks attached to the out-of-order execution pipelines (or memory, or in-order at retirement) can be used straightforwardly to implement multiway selections. It is immaterial whether they perform an immediate multiway branch, or if they produce an index which is then used for an indirect branch out of a dense table. However, indirect branches often predict poorly. Despite improvements in indirect branch predictors, if the multiple targets are truly equiprobable—as happens in compression and encryption problems—some indirect branches will always continue to predict poorly. In some applications, many of the branch conditions can be evaluated far in advance. If they could be fully evaluated, they could be used in a prepare-to-branch instruction. Thus yet another way of attaching RL to the pipeline may be to attach it in a way that allows it to precompute as many of the conditions affecting multiway branches as possible, delivering this computation, partial or full, to the front-end for use in branch prediction. If the multiway branch condition is known far enough in advance, it can be used to eliminate the need for a branch prediction; if not fully known, it may still be mixed in with the other factors such as history used to make the prediction.

In various embodiments, RL units may be virtualized. That is, such RL's may be varied in implementation, so that code can adjust to the varying capabilities of RL hardware, e.g., so that code that assumes that 4 different RL functions can be implemented in the same hardware will continue to work if only 3 can be implemented in a different implementation of the RL hardware. However, although the code may work, it may work at lower performance. Conversely, code can take advantage of more RL hardware when available. Further, RL units may be shared, between multiple users or threads in the same computing system, and context switched, e.g., as processes are timesliced.

In some embodiments, a RL unit may be virtualized by concatenating a so-called process identifier onto a RL opcode. Thus an "RL opcode" may be extended so that it can be virtualized. This ProcessID or ThreadID is placed in a special register inside the general purpose processor. The general purpose processor's instructions to invoke reconfigurable logic operations are of the form "RLop(opcode, inputs)". The "RL opcode" is either an immediate, or a value obtained from a register. The RL opcode and the ProcessID are concatenated, and are presented to logic inside the RL unit, typically a content addressable memory (CAM), that determines whether the function requested is loaded into the RL unit and, if so, what the physical RL opcode and configuration number are. If the function requested is not present, an exception occurs. An exception handler may then "fault in" the requested function.

By using the ProcessID, multiple processes can share the reconfigurable hardware. The ProcessID or ThreadID is guaranteed unique: no different users or programs should have the same value. In some embodiments, the OS provides such a value, and certain control register values may be used as such a ProcessID such as a control register (CR3), Page Table Base Register. Even without OS support, this feature can be useful to increment the ProcessID on every event that might possibly be associated with a process context switch: on every page fault, or trap, or ring transition. When the ProcessID wraps, similarly all entries in the RL virtual to physical opcode mapping table may be invalidated, discarding all of the RL configuration on every such event. It means that it will be necessary to reconfigure the RL whenever it is used after every such event; but, the RL virtual to physical opcode mapping table nevertheless allows different libraries within the same program to act as if the RL hardware is virtualized, thus OS support enables cross-process virtualization of the RL hardware. Lacking OS support, cross-process virtualization is not enabled, but intra-process virtualization between modules of the same program is enabled. So long as context switches are infrequent this is a win for performance; and it should always remain correct. For "pure" functions, it is not necessary to save the old configuration; it can be assumed that the original requester has kept it around, so that it can be reloaded. For such pure functions, handling the exception solely in the user process, without first going to the OS, is permissible.

For stateful functions such as compression engines the RL state being swapped out may be saved, which may belong to a different process. An OS level exception handler may be used; or the state can be saved eagerly, to a user specified virtual address, whenever it appears to be possible that the OS may swap the process; or the state may become part of the state that the OS context switches, e.g., through a state save instruction.

In some embodiments, a user level "exception handler" may be implemented so that a reconfigurable logic extension can be supported without requiring OS support. One such mechanism may specify the address of a function to be called, if the RL opcode exception is produced. For example, one of the RL operands may be a memory block containing this function address, amongst other things. The state may be saved in an OS transparent and conservative manner, or statelessness for the reconfigurable logic may be realized by preventing latches from being configured in the RL. Although this greatly limits the functionality of the reconfigurable logic, OS transparency is a great enough benefit to warrant it. A mode bit may be set during OS or BIOS boot to allow stateful RL to be configured if appropriate OS support or a device driver is available.

In some embodiments, virtual memory may be used to virtualize the RL configuration. In such embodiments, every RL instruction executed by the general purpose processor specifies a virtual memory address which points to an "RL control block". Additional inputs and opcodes may be provided in the instruction or in the RL control block. The processor passes the physical address of the RL control block to the RL unit; it may also pass the virtual address. The RL control block specifies the RL configuration. The RL unit contains a virtual to physical RL opcode mapping table, but here it maps the tuple (RL control block address, opcode) to the physical RL opcode and configuration number. If the input tuple is not present in the table, then the missing information can be loaded from the RL control block in memory. If the input tuple is present in the table, it can be used without delaying to reconfigure. Such embodiments may be more flexible than the mechanism set forth above. Although both can be made OS transparent, with suitable hardware support this virtual memory mechanism can support cross-process virtualization and still be OS transparent.

Because the control in such embodiments is essentially memory mapped, it may be maintained consistent. For example, it could be reloaded every instruction, it can be snooped, like a cache, or it can be maintained with "TLB consistency": loaded once, and invalidated only when an operation occurs that might lead to it being used for a different process.

In some embodiments, pipelined loading of the RL configuration can occur. For example, if there are 4 RL configurations, and configurations 0, 2, and 3 are valid, then configuration 1 can be in the process of being loaded, while the other configurations are in use. In a simple microprocessor, software can explicitly control this pipelined loading of configurations so as to lose the least amount of time. Alternately, the need for software to explicitly manage such pipelined loading of the RL configuration may be eliminated by looking ahead in the instruction stream, to see a reconfiguration instruction a long way ahead, to similarly determine which configurations are not in use, and can be replaced, thus initiating a pipelined load of the RL configuration early. To ensure correctness when such reconfiguration is done, as intervening processor stores may be in the process of changing the configuration settings stored in the RL control block, pipelined loading may be handled as other speculative loads, by detecting store to load conflicts and forwarding, or by permitting such pipelined loads only for read-only pages of memory.

Figure 3A:
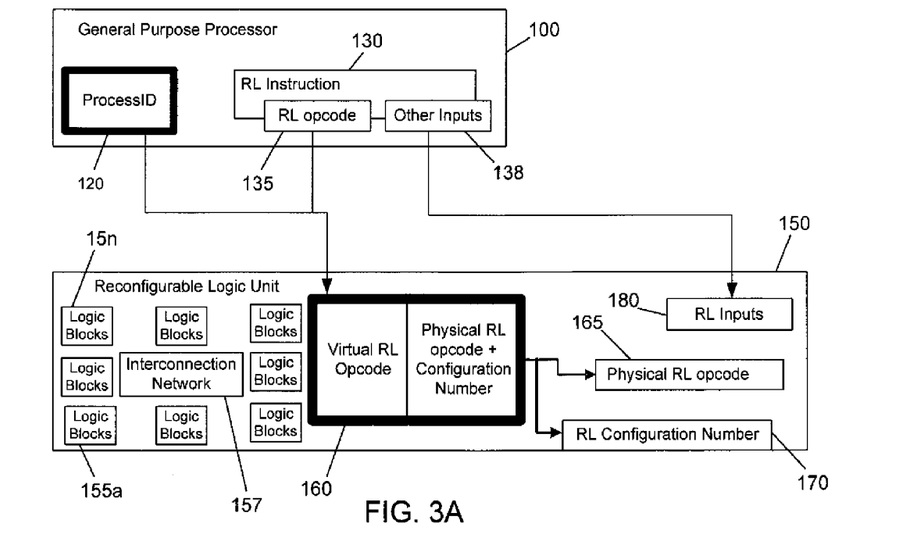
FIG. 3A is a block diagram of the interaction between a general purpose processor and a reconfigurable logic unit in accordance with one embodiment of the present invention.

Referring now to FIG. 3A, shown is a block diagram of the interaction between a general purpose processor and a reconfigurable logic unit to enable virtualization in accordance with one embodiment of the present invention. As shown in FIG. 3A, a general purpose processor 100 may be coupled to reconfigurable logic unit 150. Processor 100 includes a register to store a process ID 120 and further provides a RL instruction 130 which may include an RL opcode 135, as well as other inputs 138, which may correspond to data for the specialized function. This information may be provided to reconfigurable logic unit 150, and more specifically to a mapping table 160 that receives a virtual RL opcode and maps it to a physical RL opcode and configuration number, namely state stored in a physical RL opcode 165 and RL configuration 170, while other inputs 138 are provided to RL inputs 180.

As shown also in FIG. 3A, reconfigurable logic unit 150 may include a plurality of logic blocks $155_a$-$155_n$ (generically logic blocks 155). In various embodiments, different functionality may be present in one or more of these logic blocks. Furthermore, based on a given configuration instructed by mapping table 160, an interconnection network 157 may dynamically reconfigure connections between one or more of various logic blocks 155 to enable desired operations or functions to be performed under software control.

Figure 3B:
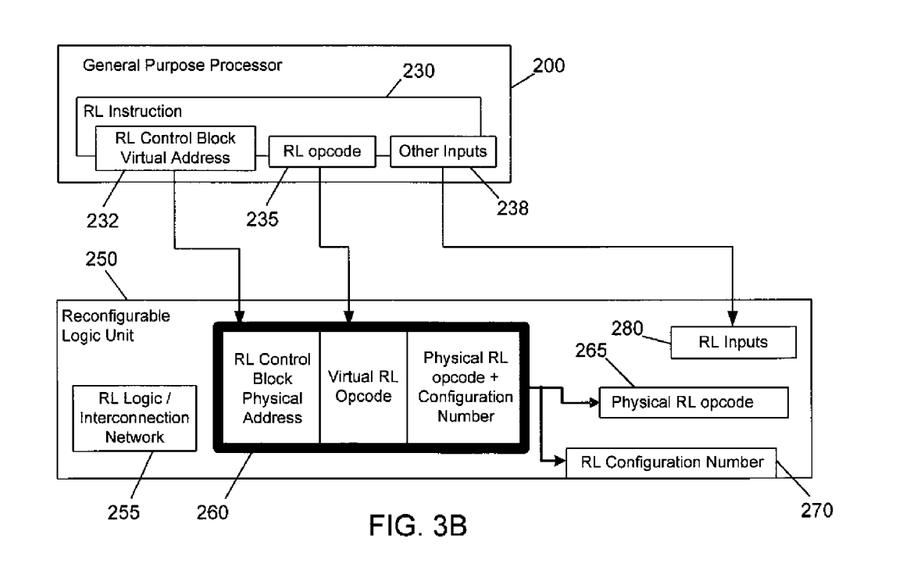
FIG. 3B is a block diagram of the interaction between a general purpose processor and a reconfigurable logic unit in accordance with another embodiment of the present invention.

Referring now to FIG. 3B, shown is a block diagram of the interaction between a general purpose processor and a reconfigurable logic unit to enable virtualization in accordance with another embodiment of the present invention. As shown in FIG. 3B, a general purpose processor 200 may be coupled to reconfigurable logic unit 250. Processor 200 provides a RL instruction 230 which may include an RL control block virtual address 232, RL opcode 235, as well as other inputs 238. This information may be provided to reconfigurable logic unit 250, and more specifically to a mapping table 260 that receives the address, and the virtual RL opcode and maps them to a physical RL opcode and configuration number, namely state stored in a physical RL opcode 265 and RL configuration 270, while other inputs 238 are provided to RL inputs 280. In the embodiment of FIG. 3B, virtual memory may virtualize the RL configuration by the providing of RL control block virtual address 232 to mapping table 260 to thus obtain physical opcode 265 and RL configuration 270. As similarly shown in FIG. 3B, a reconfigurable logic/interconnection network 255 may be present in reconfigurable logic unit 250. As described above, under appropriate software control the selection and coupling of different reconfigurable logic blocks may be realized.

Figure 4:
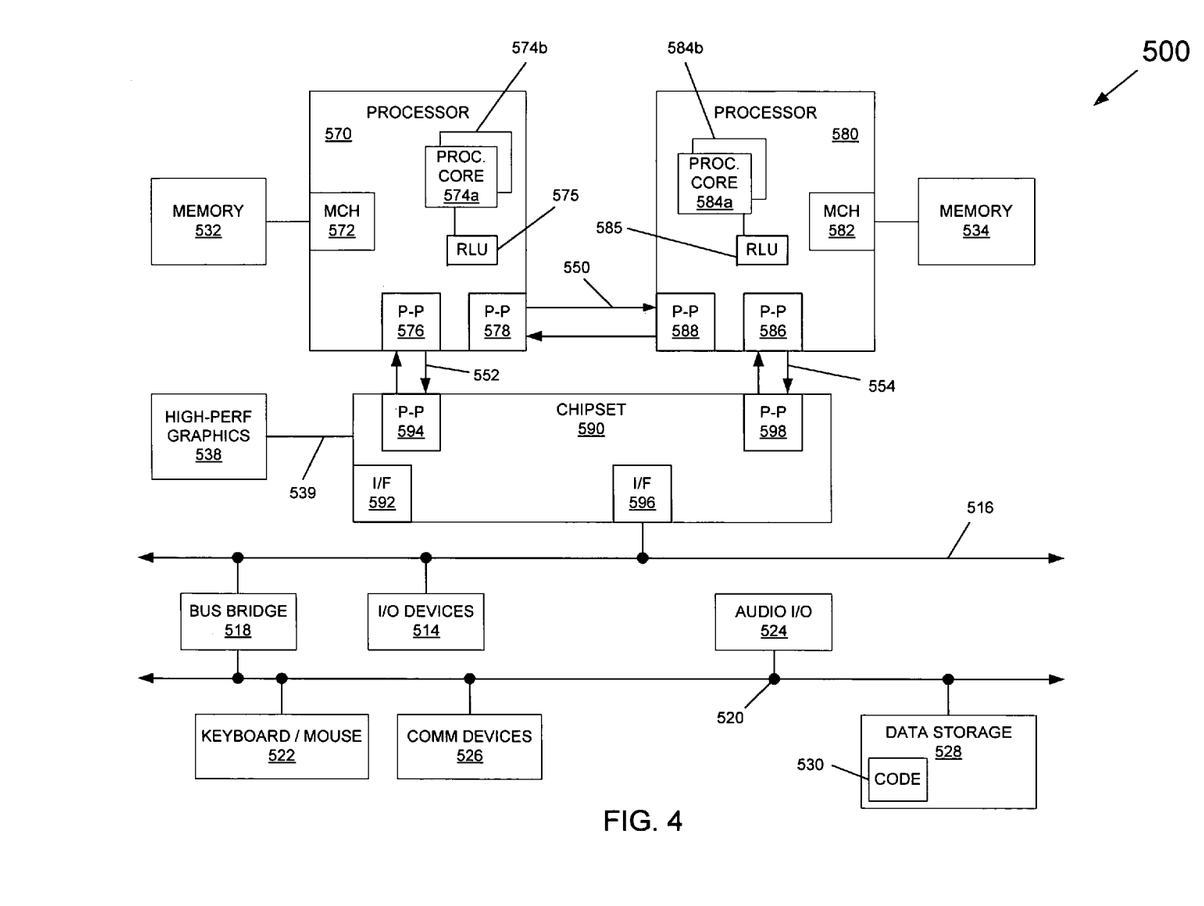
FIG. 4 is a block diagram of a multiprocessor system in accordance with an embodiment of the present invention.

Referring now to FIG. 4, shown is a block diagram of a multiprocessor system in accordance with an embodiment of the present invention. As shown in FIG. 4, multiprocessor system 500 is a point-to-point interconnect system, and includes a first processor 570 and a second processor 580 coupled via a point-to-point interconnect 550, although the multiprocessor system may be of a multi-drop bus or another such implementation. As shown in FIG. 4, each of processors 570 and 580 may be multi-core processors including first and second processor cores (i.e., processor cores 574a and 574b and processor cores 584a and 584b), although other cores and potentially many more other cores may be present in particular embodiments. Furthermore, as shown in FIG. 4 a RL unit 575 and 585 may be coupled to each pair of processor cores 574a and 574b and 584a and 584b, respectively.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors.

First processor 570 and second processor 580 may be coupled to a chipset 590 via P-P interconnects 552 and 554, respectively. As shown in FIG. 4, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 or a point-to-point interconnect may be used to couple graphics engine 538 to chipset 590. In turn, chipset 590 may be coupled to a first bus 516 via an interface 596.

As shown in FIG. 4, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a pipeline including a plurality of stages to execute instructions out of order, the stages including a plurality of front-end stages, a plurality of execution units, and a plurality of back-end stages, wherein the execution units are coupled between dispatch ports of the front-end stages and writeback ports of the back-end stages;
    a first reconfigurable logic unit including configurable logic elements coupled between one of the dispatch ports and one of the writeback ports, wherein the first reconfigurable logic unit is to perform a reconfigurable logic function indicated by a first instruction; and
    a second reconfigurable logic unit coupled between a reorder buffer and a retirement unit of the back-end stages, wherein the second reconfigurable logic unit and the retirement unit are to execute operations in order on result data from the reorder buffer.

2. The apparatus of claim 1, wherein the second reconfigurable logic unit is to perform a compression operation on matrix data of N×M form, wherein N and M are greater than 1.

3. The apparatus of claim 2, wherein the first reconfigurable logic unit is to share a port of the dispatch ports and a port of the writeback ports with a first cache memory, a translation lookaside buffer (TLB), and a page miss handler (PMH), wherein the TLB is closer to the first cache memory than the PMH, and the PMH is closer to the first cache memory than the first reconfigurable logic unit.

4. The apparatus of claim 1, wherein the first instruction includes a reconfigurable logic control block virtual address and a reconfigurable logic opcode, and the first reconfigurable logic unit includes a mapping table to map a tuple of the first instruction to a physical reconfigurable logic opcode and configuration number associated with a configuration of the configurable logic elements.

* * * * *